United States Patent [19]

Wolff

[11] 4,291,088
[45] Sep. 22, 1981

[54] FOAM PRODUCTS FROM FURFURYL ALCOHOL-AMINO-FORMALDEHYDE

[75] Inventor: Per L. Wolff, Birkerod, Denmark

[73] Assignee: Koninklijke Emballage Industrie Van Leer B.V., Amstelveen, Netherlands

[21] Appl. No.: 66,583

[22] Filed: Aug. 14, 1979

[30] Foreign Application Priority Data

Jul. 10, 1979 [NL] Netherlands .......................... 7905380

[51] Int. Cl.$^3$ .......................... B32B 5/18; B32B 17/04
[52] U.S. Cl. ..................................... 428/313; 428/921
[58] Field of Search ................. 521/187; 428/310, 313, 428/921

[56] References Cited

U.S. PATENT DOCUMENTS 3,876,620 4/1975 Moss ..................................... 428/310
4,015,386 4/1977 Cook .................................... 428/310
4,016,111 4/1977 Wolff et al. .......................... 521/187
4,130,614 12/1978 Saidla ................................... 428/313

FOREIGN PATENT DOCUMENTS 1411148 10/1975 United Kingdom ................ 428/313

Primary Examiner—William J. Van Balen
Attorney, Agent, or Firm—Lawrence Rosen

[57] ABSTRACT

Non-inflammable, non-flashing foam products such as foam boards, which comprise a layer of a rigid foam of a furfuryl alcohol-formaldehyde containing resin composition wherein at least one surface of said foam product has, as an integral part of its surface layer, porous glass fibre tissue. In accordance with another feature of the invention the glass fibre tissue surface is covered with a layer of an inorganic material such as a silicate. Methods of making these foam products are also disclosed.

8 Claims, No Drawings

FOAM PRODUCTS FROM FURFURYL ALCOHOL-AMINO-FORMALDEHYDE

The present invention relates to foam products, particularly foam boards, of a furan or furfuryl alcohol modified phenolic or amino resin composition, containing at least a sufficient amount of a boron compound so that the foam will pass the muffle furnace test at 500° C. and has no second exotherm at 200° C., having mechanically, chemically, physically and/or esthetically improved surfaces, and a method to prepare such "finished" products.

Foam boards of a furfuryl alcohol-aminoformaldehyde resin composition, containing at least a sufficient amount of a boron compound so that the foam will pass the muffle furnace test at 500° C. and has no second exotherm at 200° C., have been disclosed in U.S. Pat. No. 4,016,111, Belgian Pat. No. 827.588, Brazil Pat. No. 2552/75, Canadian Pat. No. 1,033,898, Danish Pat. No. 1276/75, DBR Pat. No. 2514542.0, British Pat. No. 1,487,204, French Pat. No. 75.10420, Israel Pat. No. 46881, Italian Pat. No. 67854A/75, Japan Pat. No. 40743/75, New Zealand Pat. No. 177.086, Russian Pat. No. 2121323, Spanish Pat. No. 436.186, Swedish Pat. No. 7503784/6 and South Africa Pat. No. 75.1648.

Though said foam boards have many very desired and valuable properties, their surfaces are friable and dusty; therefore there is a need for dimensionally stabilizing and qualitatively improving the surfaces of said foam boards in mechanical, chemical, physical and/or esthetic respects, without decreasing and preferably by enhancing the low fire hazard characteristics of said foam boards. Said purpose should be achieved by means of an economical, preferably continuous, process carried out either in the manufacturing plant or in situ, within a minimum time span.

It has been suggested to achieve said purpose by:

1. adhering films, foils, rigid boards, or combinations thereof to the foam board. Disadvantages of said methods are that the materials or the adhesives are flammable, will flash, are water-sensitive and/or temperature sensitive and will delaminate from or deform the foam board under service or fire conditions.

2. brushing, troweling (slurry) coating, or spraying a plaster layer of a paint, paste, gypsum mortar or the like on the foam board. Disadvantages of said methods are that frequently the weather and water resistance as well as the adhesion are poor, while the layers applied tend to crack or warp the foam board after drying.

During investigations to find a solution for the existing problems, it appeared that a method to achieve a good adhesion under service and usage conditions of finishing materials to the above foam boards, without impairing the performance of the finished board under actual fire conditions, is not available.

So, an object of the present invention is to provide a method for stabilizing and improving surfaces of foam boards of furan or furfuryl alcohol modified, phenolic or amino resin compositions in mechanical, physical and esthetic respects, and to prevent the defects found in existing materials when applied to said type of foams.

A second object of the present invention is to provide a method wherein the finishing materials used are anchored firmly to said type of foam boards.

A third object of the present invention is to achieve the above objects by applying components and/or materials that preserve the low fire hazard characteristics of the finished board.

A fourth object of the invention is to provide a finished foam board which is impermeable to water and puncture resistant.

It was found now that the above objects may be achieved by either:

(a) incorporating a porous glass-fibre tissue into at least one surface of said rigid foam product layer, so that it becomes an integral part of the surface layer of said foam product; or (b) applying on surface(s) according to (a) to be coated at least in part a coating of a silicate base material, having a ratio of $SiO_2$ to alkali metal oxide of 1.6:1 to 3.9:1; alternatively (c) applying on surface(s) according to (a) to be coated, at least in part, an adhesive of a silicate base material, having a ratio of $SiO_2$ to alkali metal oxide of 1.6:1 to 3.9:1 and subsequently overlaying said adhesive with a rigid or flexible facing.

Silicate base materials or binders set or harden by drying, or by reacting with other materials. Generally the water loss required to become solid is 10 to 15% of the weight of the adhesive.

The solidified silicate can still contain up to 50% water, and it will continue to lose water until equilibrium with the atmosphere under ambient conditions is reached; it will never reach the anhydrous state and may contain up to 30% water at the equilibrium point.

Potassium silicate base material is preferred because it has a higher melting point than sodium silicate based material and does not show blooming after reaction with carbon-dioxide.

In case a glass fibre tissue is used, preferably the staple fibres in said glass tissue range in size from 5 to 20, and more preferably 6 to 12 mm, and have been prepared according to the wet process.

In case additionally a silicate based adhesive material respectively a silicate based coated material is used, preferably it contains specific additives and/or fillers to achieve an excellent water, weather and/or crack resistance.

A proper additive is found to be Xanthan gum which is a polysaccharide gum derived from xanthomonas campestris by a pure culture fermentation process and purified by recovery with isopropylalcohol. Xanthan gum serves as a thickening agent and it will prevent settling of heavy fillers with a large particle size. It is also compatible with the alkaline silicate base materials, and it definitely improves the water resistance of the dry coating. Xanthan gum is added to the silicate base material in amounts of 0.05–0.05% by weight.

Other additives are boron compounds, especially alkali metalborate compounds, in amounts of 0.2–10% by weight to the silicate base material. These borates also improve the water resistance of the dried coating. Especially preferred are sodium borate and potassium borates.

Suitable fillers for coatings and adhesives are for instance talcum powder, iron oxide flakes, quartz, dolomite, pulverized flint, microspheres or microballoons, fly ash, and calcined clays, mica calcium carbonate and micronized glassfibres.

It has been found that fillers with a relatively large particle size give the best results. A preferred filler is quartz, as it appears to react with the silicate binder and offers, therefore, an excellent water resistance. Often some additives are needed in the coating material in order to facilitate the mixing of the ingredients with the silicate binder. It is advantageous to add a very small amount of a wetting agent, preferably in the order of 0.1% and a minute quantity of a defoaming agent to suppress the foaming caused by the wetting agent. After the mixing of the ingredients the addition of a water repellent agent improves the resistance to penetration of water through the coating.

Filled coatings can be applied by spray gun, even when the coating is filled with heavy micaceous iron oxide flakes, or by brush or roller. Very viscous coatings can be troweled on the foamboard or applied by using a doctor blade or a roller.

Drying can be carried out simply by exposure to air. A faster method involves moving the coated foamboard or foam tiles through an oven with a conveyor wherein warm air is blown or in which infrared radiant heaters are fitted.

Metallic foils are very suitable to be used as flexible facings. Particularly aluminium foils are preferred for this purpose.

In a preferred embodiment of the present invention in at least one surface of a furfuryl alcohol-aminoformaldehyde foam board, prepared according to the method of copending application (BO 27277), U.S. patent application Ser. No. 66,582, filed Aug. 14, 1979, a glass fibre tissue is incorporated and subsequently a solid or semi-solid layer of inorganic material such as gypsum plaster, mortar or the like is applied.

The most preferred embodiment shows a glass fibre tissue integrally incorporated in at least one surface of said foam board and a subsequently thereon applied silicate base material either as adhesive or as coating per se.

Generally the "adhesive method" is performed in the way as described herebelow, though this does not exclude variations to fall within the scope of the invention:

1. A silicate adhesive is applied to the surface of the foam board.
2. The layer of adhesives is dried until dry to touch.
3. A thin coat of silicate adhesive is applied to the flexible facing. While still wet the facing is pressed onto the dry silicate on the foam board.
4. The article is kept under light pressure for a short period until tack is fuly developed by redistribution of water in the combined adhesives layer.
5. The laminate may be stacked and left for a period until full bond strength is developed.

If applied to aluminium foil and dried, the dry silicate is water resistant. The silicate has an extremely strong bond to the aluminium and will not break off even by heavy flexing of the foil.

In a preferred method a layer of silicate is applied to the foam and allowed to dry.

Both with the xanthan Gum and with the borates additives this dried silicate layer on the foam is so water resistant that it will not readily absorb water, and therefore it will not develop tack when the layer of wet silicate is pressed against it in the next process step, unless coarse fillers are incorporated in the adhesive layer of the foam.

This leads either to a method where only the silicate on the aluminium foil contains the additive, preferably borates, or a method where both the silicate layer on the aluminium foil and on the foam contain the additive, but the latter incorporates moreover coarse fillers, that after drying provide the foam with a porous layer having an increased surface area, that can absorb enough liquid from the adhesive on the aluminium to make it stick in a very short time.

The preferred methods of application are by air spraying and/or doctor blades. Spraying minimizes the amount of adhesive required to give sufficient contact area with the overlying flexible sheet. During spraying some evaporation of water takes place, and finally a sprayed coat of silicate dries faster than the same coat applied by brush or roller.

The adhesive used on the foam is plain potassium silicate with a solid content of 30%. A pigment or dye is added to allow visual inspection of coating thickness and uniformity. A dye is preferred since pigments settle out on storage.

The silicate is used in amounts ranging from 35 up to 200 g/m$^2$ (wet), the lower weights (35-75 g) giving the better bonds.

Drying is performed under ambient conditions or with warm air blown over the foam. Drying time of 5 minutes has been realized by simple means, and drying times of 2-3 minutes are possible. The adhesive used on the foil is a mixture of potassium silicate and sodium tetraborate (200 parts silicate plus 50 parts 10% solution of sodium tetraborate). The amount sprayed on the foil is about 30-40 g/m$^2$ (wet).

The foil is pressed onto the foam in a simple air operated day-light press. The pressure required is low. Good results have been obtained by laminating pressures in the range 10-40 KPa (0.1-0.4 kg/cm$^2$). Press time can be 2 minutes with aluminium foil as facing. After pressing the laminates can be handled and stacked. Full bond strength is developed overnight.

Originally the bond strength was tested by subjecting 45×45 mm squares of laminated foam to a tensile strength testing. However, it has been found that the bond strength of the silicates is so high that the failure during the test always takes place in the foam core-normally 2-5 mm under the glass tissue.

It is for that reason that now the 180° C. peel strength of a strip of flexible facing which is loosened from the glass tissue of the foam and peeled back in a direction parallel to the foam board surface is measured. This method provides an indication of the bond strength between the facing and foam surface independent of foam properties.

The silicate based adhesives should be well suited for industrial lamination.

The solutions are aqueous and thus eliminate the health, fire, and pollution problems connected with the use of organic solvents.

The adhesives can be applied by spraying both to the foam and to the facing. This presents no problems in case simple conventional equipment will be used. The adhesive does not set or clog the equipment, and cleaning can be done with water. The adhesive applied to the foam has to be dried. This drying can be done with hot air, for example, by passing the board through a tunnel in which hot air is blown in counter current to the movement of the board. The drying will take just a couple of minutes and can be further speeded up by spraying with a heated silicate solution.

After drying the board is contacted with the facing onto which a thin coat of silicate adhesive has been applied. This can be done with a nip set of the basic form; preferably said nip set should comprise a pressure belt rather than a pressure roller.

The following examples illustrate the invention:

EXAMPLE 1

This example illustrates the use of glass fibre tissue as means of obtaining a strong bond between the foam and a coating. Foam board according to U.S. Pat. No. 4,016,111 is trimmed and cut to tiles of 60×50×2,5 cms. The dust is removed from the cut surfaces by vacuum cleaning. Onto one of the 60×60 cm surfaces a filled silicate coating is applied by spraying in a layer about 0,6mm thick. The coated tiles are left overnight for drying. After drying it is found that the tiles show some warping and the coating has begun to crack and chip off from the foam. The bond between foam and the coating appear weak and full of stresses which result in delamination and make the tiles useless.

A new set of tiles are prepared but this time the foam is moulded as 60×90×2,5 cm boards by the process of our copending application NO 27277 and have a surface containing a 60 g/m² glass tissue of 12 mm staple fibres. The silicate coating is again applied onto one surface and dried overnight. This time the tiles are free of warping and the silicate coating is homogeneous, free of cracks, has an excellent bond to the foam, high puncture resistance and remains intact under testing in a simulated fire test.

EXAMPLE 2

Foam board, made according to U.S. Pat. No. 4,016,111 was coated with a layer of adhesive which had the following composition: Potassium silicate K 53 of Crossfield Chemicals (solids content 30%), by spraying onto foamboard tiles of the size 30×30×2 cm in an amount of 50 gr/m². A mixture of potassium silicate K 53, 200 parts by weight, and 50 parts by weight sodium tetraborate (10% aqueous solution) is sprayed on aluminium foil of medium temper and of 50μ thickness. The foil is immediately pressed on the foam board tile and kept under pressure for 2 minutes.

The laminated tile is left to dry overnight. A 180° peel test indicated a peel strength of 180 gr/cm strip width.

The laminated tile is now exposed to a fire test, with excellent results. At a heat flux of 0.6 cal/cm² sec. no ignition was observed during the test which lasts 30 minutes. Light transmission of the exhaust gases was never lower than 98% during the test. After the test, it appeared that the aluminium foil had remained on the tile, without delamination occurring.

As a comparison, an identical foam board tile was coated with 40 gr/m of a neoprene adhesive. Immediately thereafter the aluminium foil was pressed on the foam board tile, and was left to dry overnight. The same fire test was carried out, this time with a heat flux of 0.4 cal/cm² sec. After 2 minutes and 45 seconds the laminated tile ignited and burned. Light transmission of the exhaust gases was 15% at a certain stage. This material is unacceptable as a low fire hazard insulation material.

What is claimed is:

1. A non-inflammable, non-flashing foam product, particularly foam board, comprising:
   (a) a layer of a rigid foam product of a furfuryl alcohol-aminoformaldehyde resin composition containing at least a sufficient amount of a boron compound so that the foam will pass the muffle furnace test at 500° C. and has no second exotherm at 200° C.;
   (b) at least one surface of said layer of rigid foam product having, as an integral part of its surface layer, a porous glass fibre tissue;
   (c) a solid or semi-solid layer of an inorganic material applied subsequently onto the glass fibre tissue containing surface.

2. A non-inflammable, non-flashing foam product, particularly foam board, comprising:
   (a) a layer of a rigid foam product of a furfuryl alcohol-aminoformaldehyde resin composition containing at least a sufficient amount of a boron compound so that the foam will pass the muffle furnace test at 500° C. and has no second exotherm at 200° C.;
   (b) at least one surface of said layer of rigid foam product having, as an integral part of its surface layer, a porous glass fibre tissue;
   (c) at least one surface of said rigid foam product layer on which has been applied, at least in part, an adhesive of a silicate base material, having a ratio of $SiO_2$ to alkali metal oxide of 1.6:1 to 3.9:1;
   (d) a rigid or flexible facing overlying said adhesive.

3. The foam product of claims 2 wherein the fibers in the glass tissue range in size from 6 to 12 mm.

4. The laminate of claims 2 or 3, wherein the silicate base material contains a boron compound.

5. The foam product of claim 4 wherein said boron compound is a borate.

6. The foam product of claim 4 wherein said boron compound is borax.

7. The foam product of claim 2 wherein said flexible facing is a metallic foil.

8. The foam product of claim 7 wherein said metallic foil is an aluminium foil.

* * * * *